United States Patent
Liu et al.

(10) Patent No.: US 8,012,372 B2
(45) Date of Patent: Sep. 6, 2011

(54) BORATE PHOSPHOR AND WHITE LIGHT ILLUMINATION DEVICE UTILIZING THE SAME

(75) Inventors: Wei-Jen Liu, Taoyuan (TW);
Yao-Tsung Yeh, Taoyuan (TW);
Shyue-Ming Jang, Hsinchu (TW);
Chien-Yueh Tung, Taipei (TW);
Chih-Pin Wu, Hsinchu (TW);
Teng-Ming Chen, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 634 days.

(21) Appl. No.: 12/122,718

(22) Filed: May 18, 2008

(65) Prior Publication Data
US 2009/0214893 A1 Aug. 27, 2009

(30) Foreign Application Priority Data
Feb. 25, 2008 (TW) .............................. 97106447 A (51) Int. Cl.
*C09K 11/02* (2006.01)
*C09K 11/77* (2006.01)
*H01J 29/10* (2006.01)
(52) U.S. Cl. .................. 252/301.4 R; 313/467; 313/468
(58) Field of Classification Search .................. 252/178, 252/301.4 R, 301.6 R; 428/690; 313/468, 313/469, 467
See application file for complete search history.

(56) References Cited

U.S. PATENT DOCUMENTS

| | | | | |
|---|---|---|---|---|
| 3,423,325 | A | * | 1/1969 | Willem et al. ......... 252/301.4 R |
| 4,202,794 | A | | 5/1980 | Lehmann |
| 5,132,043 | A | | 7/1992 | Deboer |
| 6,007,741 | A | | 12/1999 | Hunt, Jr. et al. |
| 6,085,971 | A | | 7/2000 | Tews et al. |
| 6,165,385 | A | | 12/2000 | Rao et al. |
| 6,252,254 | B1 | | 6/2001 | Soules et al. |
| 6,407,498 | B1 | | 6/2002 | Justel et al. |
| 6,905,636 | B2 | | 6/2005 | Yuan et al. |
| 6,943,380 | B2 | | 9/2005 | Ota et al. |
| 7,056,451 | B2 | | 6/2006 | Manivannan et al. |

(Continued)

FOREIGN PATENT DOCUMENTS
GB 1453991 10/1976
(Continued)

OTHER PUBLICATIONS

Diaz et al., "Red, Green and Blue Eu2+ Luminescence in Solid-State Borates: A Structure-Property Relationship", published Feb. 1996, Materials Research Bulletin, vol. 31, No. 2, (pp. 147-151).*

(Continued)

*Primary Examiner* — Jerry A Lorengo
*Assistant Examiner* — Lynne Edmondson
(74) *Attorney, Agent, or Firm* — Pai Patent & Trademark Law Firm; Chao-Chang David Pai (57) ABSTRACT

The invention provides borate phosphors composed of $M_a(M_b)_{1-x}BO_3:(M_c)_x$, wherein $M_a$ is Li, Na, K, Rb, Cs, or combinations thereof, $M_b$ is Mg, Ca, Sr, Ba, Zn or combinations thereof, $M_c$ is Y, La, Pr, Nd, Eu, Gd, Tb, Ce, Dy, Yb, Er, Sc, Mn, Zn, Cu, Ni, Lu, or combinations thereof, and $0 \leq x \leq 0.3$. The borate phosphors emit visible light under the excitation of ultraviolet light or blue light, and may be further collocated with different colored phosphors to provide a white light illumination device.

19 Claims, 14 Drawing Sheets

U.S. PATENT DOCUMENTS

| | | | |
|---|---|---|---|
| 7,060,202 B2 | 6/2006 | Shi et al. | |
| 7,088,038 B2 | 8/2006 | Srivastava et al. | |
| 7,122,128 B2 | 10/2006 | Comanzo et al. | |
| 7,128,849 B2 | 10/2006 | Setlur et al. | |
| 7,176,501 B2 | 2/2007 | Lee et al. | |
| 7,229,573 B2 * | 6/2007 | Setlur et al. | 252/301.4 R |
| 7,274,045 B2 | 9/2007 | Chandran et al. | |
| 2006/0208270 A1 | 9/2006 | Chandran et al. | |
| 2007/0170396 A1 * | 7/2007 | Appleby et al. | 252/301.4 F |
| 2008/0093979 A1 * | 4/2008 | Bechtel et al. | 313/503 |
| 2009/0160316 A1 * | 6/2009 | Chen et al. | 313/503 |

FOREIGN PATENT DOCUMENTS

JP  2008066297 A * 3/2008

OTHER PUBLICATIONS

Wu et al., 'Ab initio structure determination of novel borate NaSrB03', Feb. 2006, Journal of Solid State Chemistry, 179 pp. 1219-1224.*

Gong et al., 'Growth, Band Structure and Optical Properties of LiSrBO3 Crystal', Oct. 2007, Chinese J. Struct. Chem., vol. 26, No. 10, pp. 1165-1170.*

* cited by examiner

BORATE PHOSPHOR AND WHITE LIGHT ILLUMINATION DEVICE UTILIZING THE SAME

BACKGROUND OF THE INVENTION

1. Field of the Invention

The present invention relates to a borate phosphor, and in particular relates to a white light illumination device utilizing the same.

2. Description of the Related Art

Commercially available white light illumination devices such as light emitting diodes (hereinafter LED), have gradually replaced conventional tungsten lamps or fluorescent lamps due to high luminescence efficiency and eco-friendliness. For white LEDs, the phosphor composition located within, is a critical factor determining luminescence efficiency, color rendering, color temperature, and lifespan of white LEDs.

In general, the excitation light source of conventional phosphors is a short wavelength ultraviolet light (UV) such as 147 nm, 172 nm, 185 nm, or 254 nm. The phosphors excited by the short wavelength UV have high light absorption and light transfer efficiency. Compared with phosphors excited by short wavelength UV, phosphors excited by long wavelength UV or visible light (350-470 nm) are rare.

In the field, conventional host materials in the phosphor are sulfides, nitrides, or oxides such as silicates or aluminates. Sulfides have high light transfer efficiency, but are unstable and easily degraded by moisture or oxygen. Meanwhile, nitrides are stable, but they are difficult to manufacture as nitrides require a high temperature/pressure condition, thus increasing costs and decreasing production yields. Compared the described phosphors, the borate phosphor of the invention has advantages such as low preparation temperature, high optical stability, and high chemical stability. Accompanied with blue-light or UV LED or laser diode, the borate phosphor may emit visible light. Furthermore, the borate phosphor may collocate with other suitable phosphors to emit different colors to complete a white light illumination device.

SUMMARY OF THE INVENTION

The invention provides a borate phosphor, having a formula as $M_a(M_b)_{1-x}BO_3:(M_c)_x$. $M_a$ is Li, Na, K, Rb, Cs, or combinations thereof, $M_b$ is Mg, Ca, Sr, Ba, Zn, or combinations thereof, $M_c$ is Y, La, Pr, Nd, Eu, Gd, Tb, Ce, Dy, Yb, Er, Sc, Mn, Zn, Cu, Ni, Lu, or combinations thereof, and $0 \leq x \leq 0.3$.

The invention further provides a white light illumination device comprising the borate phosphor as described as above and an excitation light source, wherein the excitation light source emits 200-400 nm UV or 400-470 nm blue light.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a borate phosphor, having a formula as $M_a(M_b)_{1-x}BO_3:(M_c)_x$, wherein $M_a$ is Li, Na, K, Rb, Cs, or combinations thereof, $M_b$ is Mg, Ca, Sr, Ba, Zn, or combinations thereof, $M_c$ is Y, La, Pr, Nd, Eu, Gd, Tb, Ce, Dy, Yb, Er, Sc, Mn, Zn, Cu, Ni, Lu, or combinations thereof, and $0 \leq x \leq 0.3$. For example, the borate phosphors can be $LiCa_{1-x}BO_3:Ce_x$, $LiSr_{1-x}BO_3:Ce_x$, $NaCa_{1-x}BO_3:Ce_x$, $NaSr_{1-x}BO_3:Ce_x$, $NaBa_{1-x}BO_3:Ce_x$, $NaCa_{1-x}BO_3:Eu_x$, $NaSr_{1-x}BO_3:Eu_x$, $NaBa_{1-x}BO_3:Eu_x$, $LiBa_{1-x}BO_3:Eu_x$, $KCa_{1-x}BO_3:Ce_x$, or $KSr_{1-x}BO_3:Ce_x$. After excited by blue light (400 nm to 470 nm) or UV (200 nm to 400 nm), the borate phosphors may emit visible lights with different wavelength. In addition, the excitation light source of the borate phosphors can be a light-emitting diode or a laser diode.

The method for preparing the described aluminosilicate is sintering. First, the appropriate stoichiometry of reagents was weighted according to the element molar ratio of resulting borates. The reagents containing Li, Na, K, Rb, Cs, or combinations thereof can be chlorides such as (Li, Na, K, Rb, Cs)Cl. The reagents containing Mg, Ca, Sr, Ba, Zn, or combinations thereof can be oxides such as (Mg, Ca, Sr, Ba, Zn)O or carbonates such as (Mg, Ca, Sr, Ba)$CO_3$. The reagents containing Y, La, Pr, Nd, Eu, Gd, Tb, Ce, Dy, Yb, Er, Sc, Mn, Zn, Cu, Ni, Lu, or combinations thereof can be chlorides such as $EuCl_2$ and the likes, fluorides such as $CeF_3$ and the likes, oxides such as $Mn_3O_4$, $MnO_2$, $Eu_2O_3$, $CeO_2$, and the likes, carbonates such as $MnCO_3$ and the likes, acetates such as $Mn(CH_3COO)_2$ and the likes, and nitrates such as $Ce(NO_3)_3$ and the likes. The boron containing reagents includes oxides such as boron oxide ($B_2O_3$) or boric acid ($H_3BO_3$). The described reagents were evenly mixed and grinded, and charged in a double-crucible. The double-crucible was then stuffed by graphite, and then heated in a high temperature furnace. After sintering at 700-1000° C. for several hours, washing, and heat drying, the described borate phosphors were prepared.

In one embodiment, the borate phosphor emits blue light after being excited by blue light or UV light. In this embodiment, the borate phosphors may collocate with a UV or blue light excitable yellow phosphor. Arranged with a UV excitation light source such as a light-emitting diode or laser diode, a white light emitting diode or white laser diode is completed. The described yellow phosphor includes $Y_3Al_5O_{12}:Ce^{3+}$ (YAG), $Tb_3Al_5O_{12}:Ce^{3+}$ (TAG), $(Mg, Ca, Sr, Ba)_2SiO_4:Eu^{2+}$, and other suitable yellow phosphors. If the yellow phosphor is UV excitable, the yellow phosphor is directly excited by the excitation light source. If the yellow phosphor is blue light excitable, the yellow phosphor is indirectly excited by blue light. The blue light is emitted from the borate phosphor excited by the excitation light source. The combination and ratio of blue and yellow phosphors are optional in different applications of direct or indirect excitation.

For improving the color rendering, the described phosphors of the invention may collocate with a UV or blue light excitable red and green phosphors. Arranged with an ultraviolet excitation light source such as a light-emitting diode or laser diode, a white light emitting diode or white laser diode is completed. The red phosphor includes $(Sr, Ca)S:Eu^{2+}$, $(Y, La, Gd, Lu)_2O_3:(Eu^{3+}, Bi^{3+})$, $(Y, La, Gd, Lu)_2O_2S:(Eu^{3+}, Bi^{3+})$, $Ca_2Si_5N_8:Eu^{2+}$, ZnCdS:AgCl, or other suitable red phosphors. The green phosphor includes $BaMgAl_{10}O_{17}:(Eu^{2+},Mn^{2+})$, $SrGa_2S_4:Eu^{2+}$, $(Ca, Sr, Ba)Al_2O_4:(Eu^{2+}, Mn^{2+})$, $(Ca, Sr, Ba)_4Al_{14}O_{25}:Eu^{2+}$, $Ca_8Mg(SiO_4)_4Cl_2:(Eu^{2+}, Mn^{2+})$, or other suitable green phosphors. Similar to yellow phosphor, the red and green phosphor can be divided into being directly or indirectly excitable. If the red or green phosphor is UV excitable, the red or green phosphor is directly excited by the excitation light source. If the red or green phosphor is blue light excitable, the red or green phosphor is indirectly excited by blue light. The blue light is emitted from the borate phosphor excited by the excitation light source. The combination and ratio of red, green, and blue phosphors are optional in different applications of direct or indirect excitation.

For the white light illumination device such as described, a white light emitting diode or white laser diode, and the blue/yellow or red/green/blue phosphors can be evenly mixed in preferable ratio and dispersed in an optical gel. The optical gel containing the phosphors may further seal a near UV excitation light source such as a chip of a light emitting diode or a laser diode. Note that if UV is selected as the excitation light source, a UV filter or other UV insulator should be arranged externally from the white light illumination device to protect user's eyes and skin.

EXAMPLES

Example 1

Figure 1:
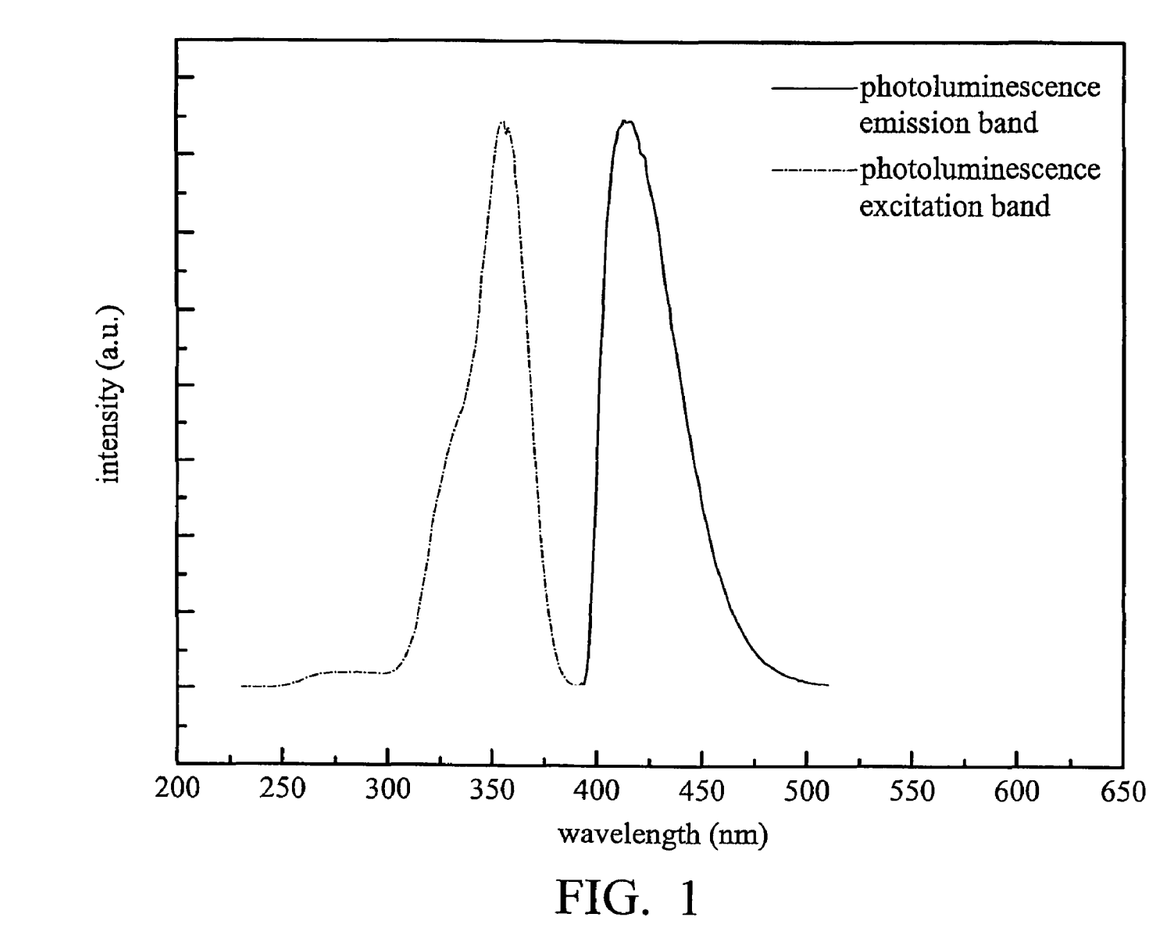
FIG. 1 is a photoluminescence spectrum of the borate phosphor $LiCa_{0.99}BO_3:Ce_{0.01}$ in one example of the invention.

0.5 mol of $Li_2CO_3$ (0.1847 g, FW=73.89, commercially available from ALDRICH, 99.99%), 0.99 mol of $CaCO_3$ (0.4954 g, FW=100.086, commercially available from ALDRICH, 99.99%), 0.01 mol of $CeO_2$ (0.0086 g, FW=172.118, commercially available from STREM, 99.998%), and 1 mol of $H_3BO_3$ (0.3092 g, FW=61.83, commercially available from STREM, 99.9995%) were weighted, evenly mixed and grinded, and charged in a double-crucible. The double-crucible was then stuffed by graphite, and then heated in a high temperature furnace. After sintering at 700-1000° C. for 10 hours, washing, filtering, and heat drying, pure phase of the borate phosphor $LiCa_{0.99}BO_3:Ce_{0.01}$ was prepared. The photoluminescence spectrum of the described product is shown in FIG. 1. The major peak of the excitation band is 356 nm, the major peak of the emission band is 413 nm, and the CIE coordination is (0.16, 0.03).

Example 2

Figure 2:
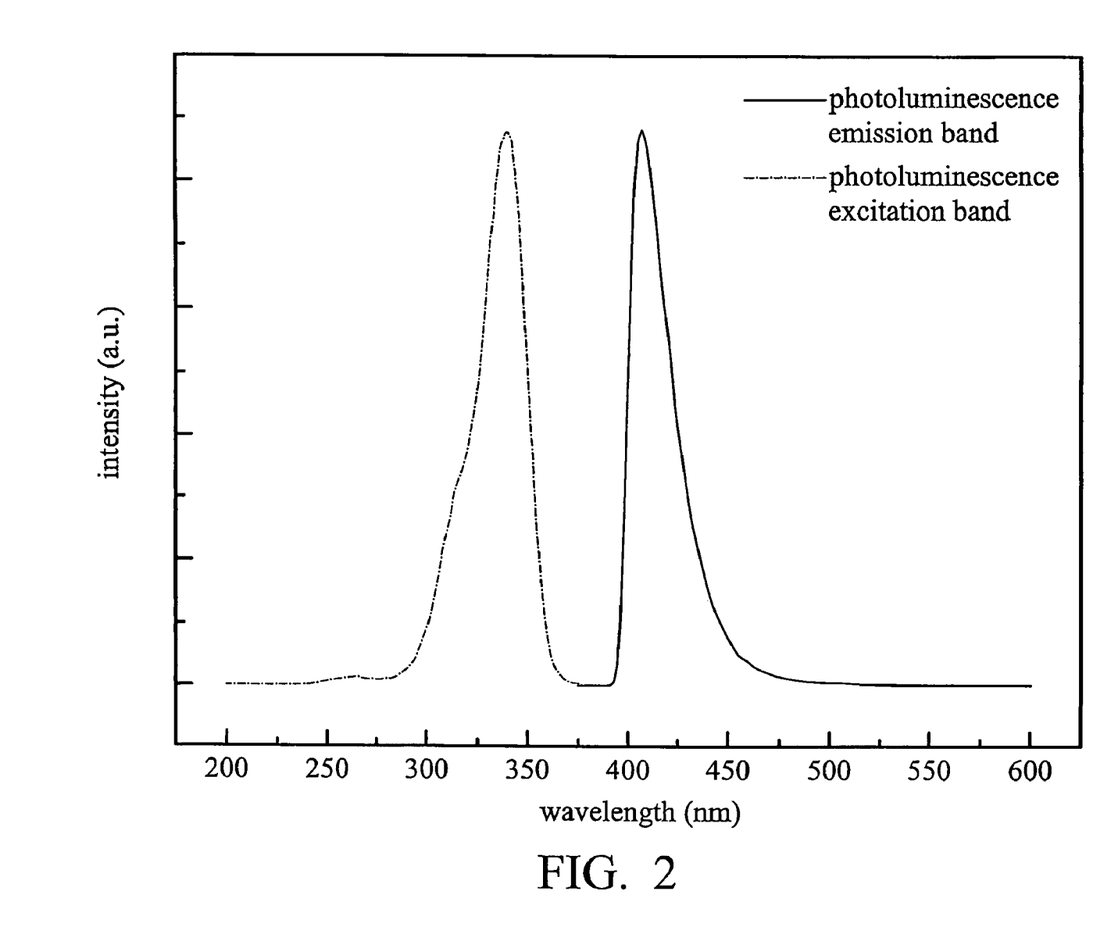
FIG. 2 is a photoluminescence spectrum of the borate phosphor $LiSr_{0.99}BO_3:Ce_{0.01}$ in one example of the invention.

0.5 mol of $Li_2CO_3$ (0.1847 g, FW=73.89, commercially available from ALDRICH, 99.99%), 0.99 mol of $SrCO_3$ (0.7308 g, FW=147.63, commercially available from ALDRICH, 99.9%), 0.01 mol of $CeO_2$ (0.0086 g, FW=172.118, commercially available from STREM, 99.998%), and 1 mol of $H_3BO_3$ (0.3092 g, FW=61.83, commercially available from STREM, 99.9995%) were weighted, evenly mixed and grinded, and charged in a double-crucible. The double-crucible was then stuffed by graphite, and then heated in a high temperature furnace. After sintering at 700-1000° C. for 10 hours, washing, filtering, and heat drying, pure phase of the borate phosphor $LiSr_{0.99}BO_3:Ce_{0.01}$ was prepared. The photoluminescence spectrum of the described product is shown in FIG. 2. The major peak of the excitation band is 340 nm, the major peak of the emission band is 407 nm, and the CIE coordination is (0.16, 0.03).

Example 3

Figure 3:
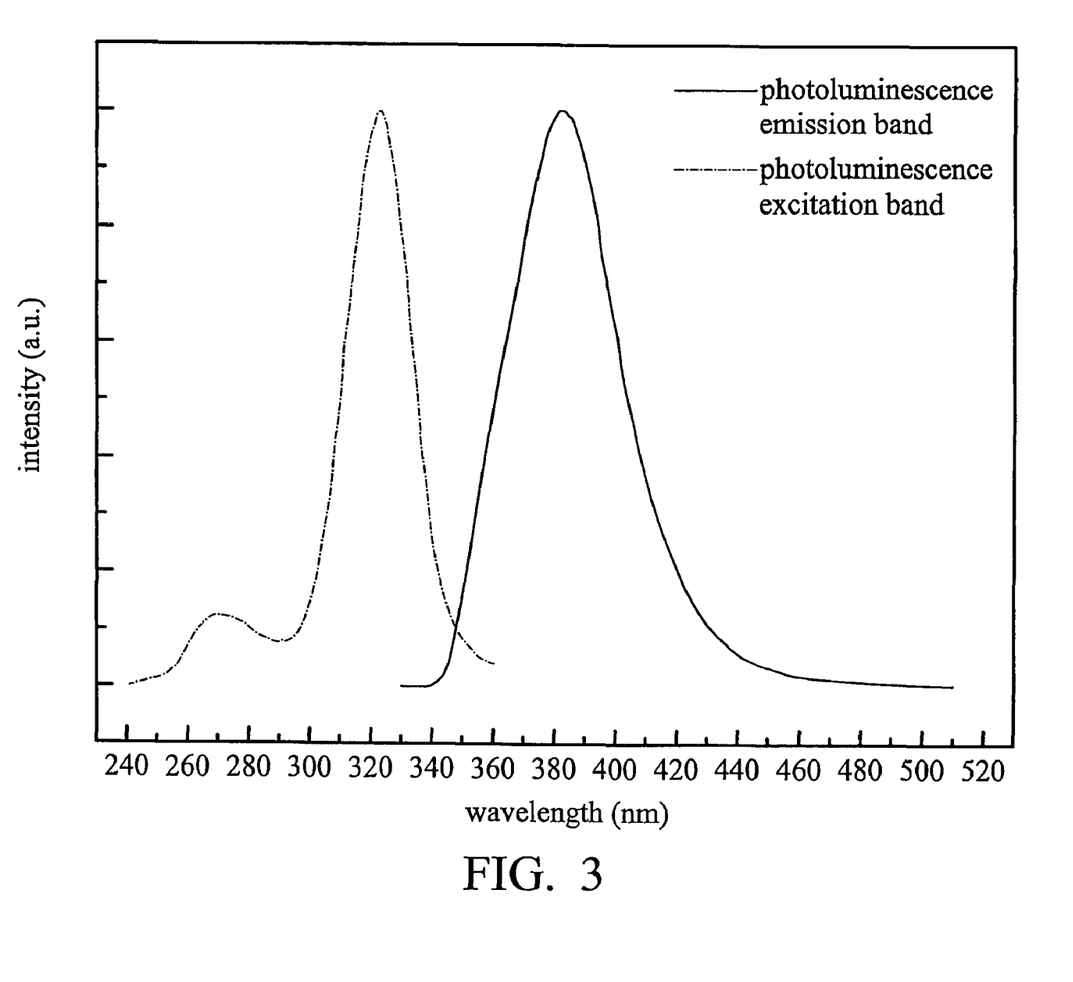
FIG. 3 is a photoluminescence spectrum of the borate phosphor $LiBa_{0.99}BO_3:Ce_{0.01}$ in one example of the invention.

0.5 mol of $Li_2CO_3$ (0.1847 g, FW=73.89, commercially available from ALDRICH, 99.99%), 0.99 mol of $BaCO_3$ (0.9768 g, FW=187.338, commercially available from ALDRICH, 99.99%), 0.01 mol of $CeO_2$ (0.0086 g, FW=172.118, commercially available from STREM, 99.998%), and 1 mol of $H_3BO_3$ (0.3092 g, FW=61.83, commercially available from STREM, 99.9995%) were weighted, evenly mixed and grinded, and charged in a double-crucible. The double-crucible was then stuffed by graphite, and then heated in a high temperature furnace. After sintering at 700-1000° C. for 10 hours, washing, filtering, and heat drying, pure phase of the borate phosphor $LiBa_{0.99}BO_3:Ce_{0.01}$ was prepared. The photoluminescence spectrum of the described product is shown in FIG. 3. The major peak of the excitation band is 323 nm, the major peak of the emission band is 382 nm, and the CIE coordination is (0.17, 0.05).

Example 4

Figure 4:
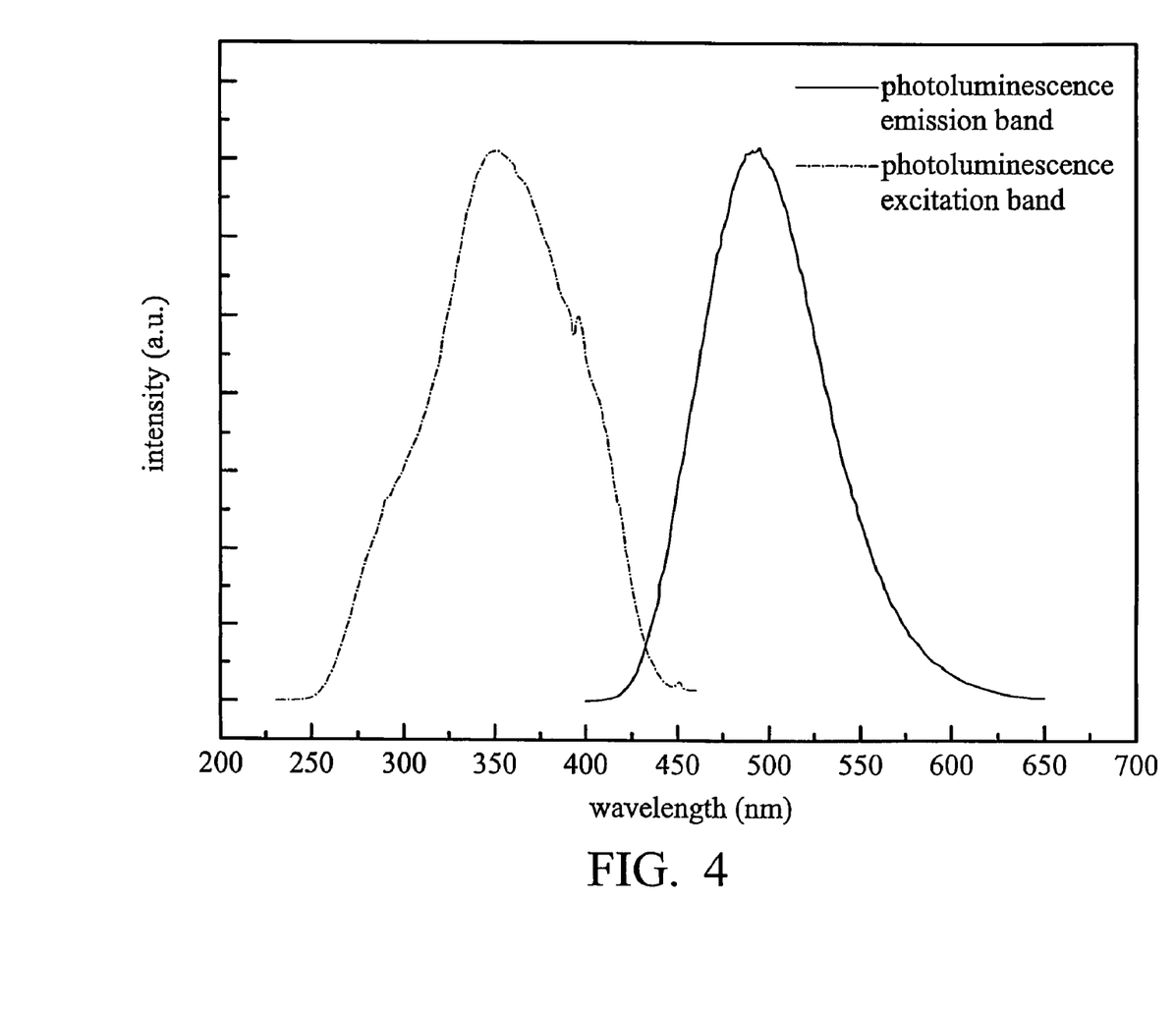
FIG. 4 is a photoluminescence spectrum of the borate phosphor $LiBa_{0.99}BO_3:Eu_{0.01}$ in one example of the invention.

0.5 mol of $Li_2CO_3$ (0.1847 g, FW=73.89, commercially available from ALDRICH, 99.99%), 0.99 mol of $BaCO_3$ (0.9768 g, FW=197.338, commercially available from ALDRICH, 99.99%), 0.005 mol of $Eu_2O_3$ (0.0088 g, FW=351.92, commercially available from ALDRICH, 99.9%), and 1 mol of $H_3BO_3$ (0.3092 g, FW=61.83, commercially available from STREM, 99.9995%) were weighted, evenly mixed and grinded, and charged in a double-crucible. The double-crucible was then stuffed by graphite, and then heated in a high temperature furnace. After sintering at 700-1000° C. for 10 hours, washing, filtering, and heat drying, pure phase of the borate phosphor $LiBa_{0.99}BO_3:Eu_{0.01}$ was prepared. The photoluminescence spectrum of the described product is shown in FIG. 4. The major peak of the excitation band is 350 nm, the major peak of the emission band is 495 nm, and the CIE coordination is (0.21, 0.38).

Example 5

Figure 5:
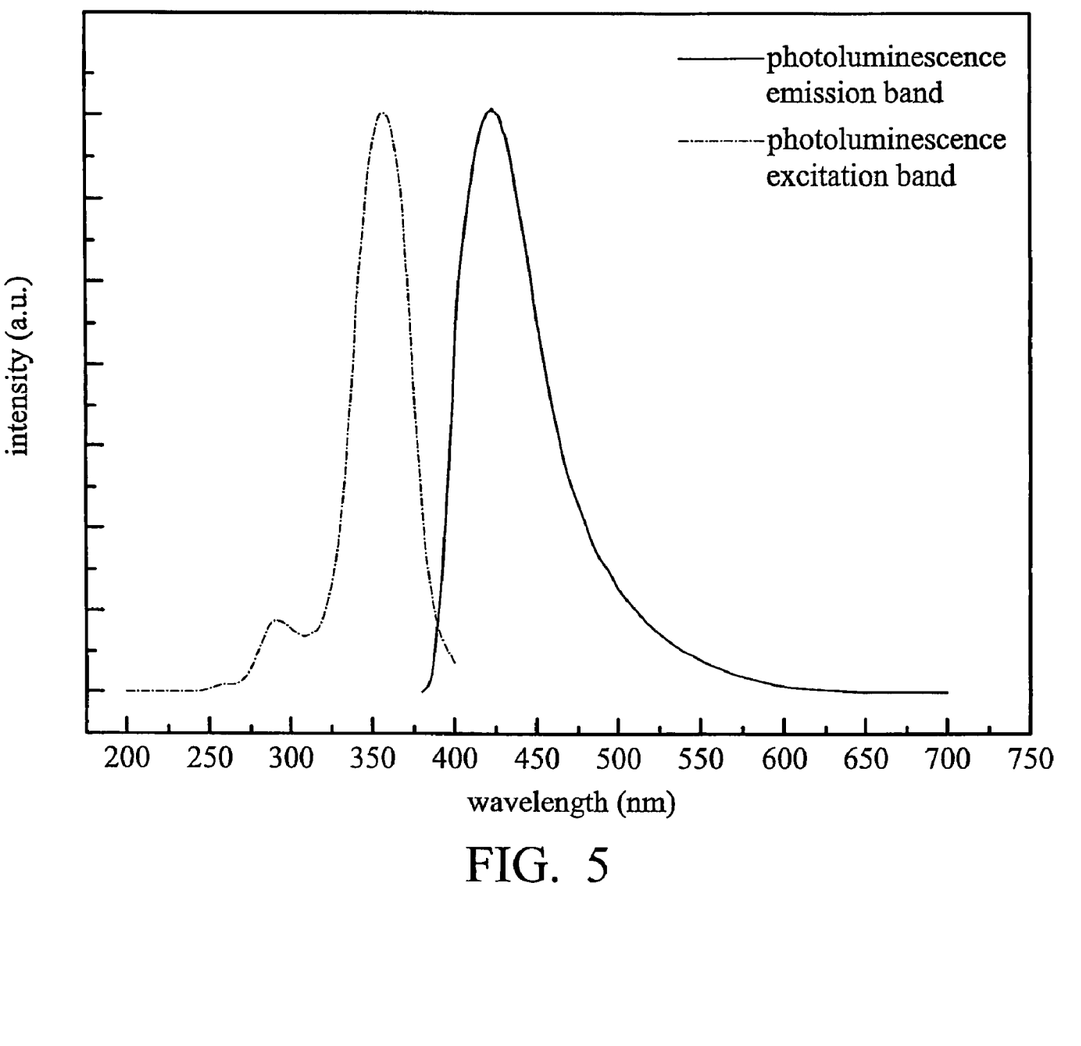
FIG. 5 is a photoluminescence spectrum of the borate phosphor $NaCa_{0.99}BO_3:Ce_{0.01}$ in one example of the invention.

0.5 mol of $Na_2CO_3$ (0.265 g, FW=105.99, commercially available from TEDLA, 99.8%), 0.99 mol of $CaCO_3$ (0.4954 g, FW=100.086, commercially available from ALDRICH, 99.99%), 0.01 mol of $CeO_2$ (0.0086 g, FW=172.118, commercially available from STREM, 99.998%), and 1 mol of $H_3BO_3$ (0.3092 g, FW=61.83, commercially available from STREM, 99.9995%) were weighted, evenly mixed and grinded, and charged in a double-crucible. The double-crucible was then stuffed by graphite, and then heated in a high temperature furnace. After sintering at 700-1000° C. for 10 hours, washing, filtering, and heat drying, pure phase of the borate phosphor $NaCa_{0.99}BO_3:Ce_{0.01}$ was prepared. The photoluminescence spectrum of the described product is shown in FIG. 5. The major peak of the excitation band is 357 nm, the major peak of the emission band is 423 nm, and the CIE coordination is (0.16, 0.11).

Example 6

Figure 6:
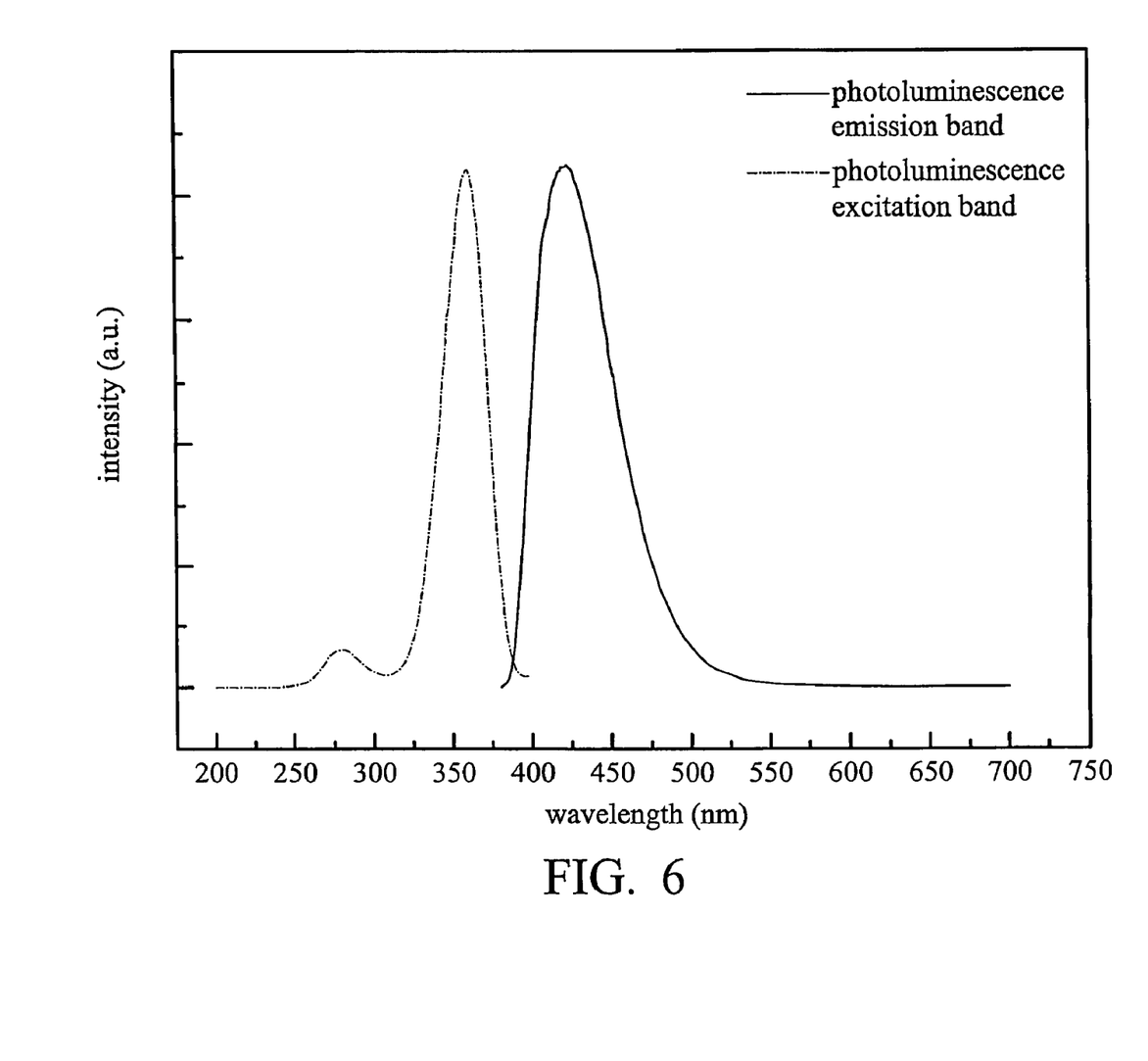
FIG. 6 is a photoluminescence spectrum of the borate phosphor $NaSr_{0.99}BO_3:Ce_{0.01}$ in one example of the invention.

0.5 mol of $Na_2CO_3$ (0.2650 g, FW=105.99, commercially available from TEDLA, 99.8%), 0.99 mol of $SrCO_3$ (0.7308 g, FW=147.63, commercially available from ALDRICH, 99.9%), 0.01 mol of $CeO_2$ (0.0086 g, FW=172.118, commercially available from STREM, 99.998%), and 1 mol of $H_3BO_3$ (0.3092 g, FW=61.83, commercially available from STREM, 99.9995%) were weighted, evenly mixed and grinded, and charged in a double-crucible. The double-crucible was then stuffed by graphite, and then heated in a high temperature furnace. After sintering at 700-1000° C. for 10 hours, washing, filtering, and heat drying, pure phase of the borate phosphor $NaSr_{0.99}BO_3:Ce_{0.01}$ was prepared. The photoluminescence spectrum of the described product is shown in FIG. 6. The major peak of the excitation band is 360 nm, the major peak of the emission band is 423 nm, and the CIE coordination is (0.15, 0.04).

Example 7

Figure 7:
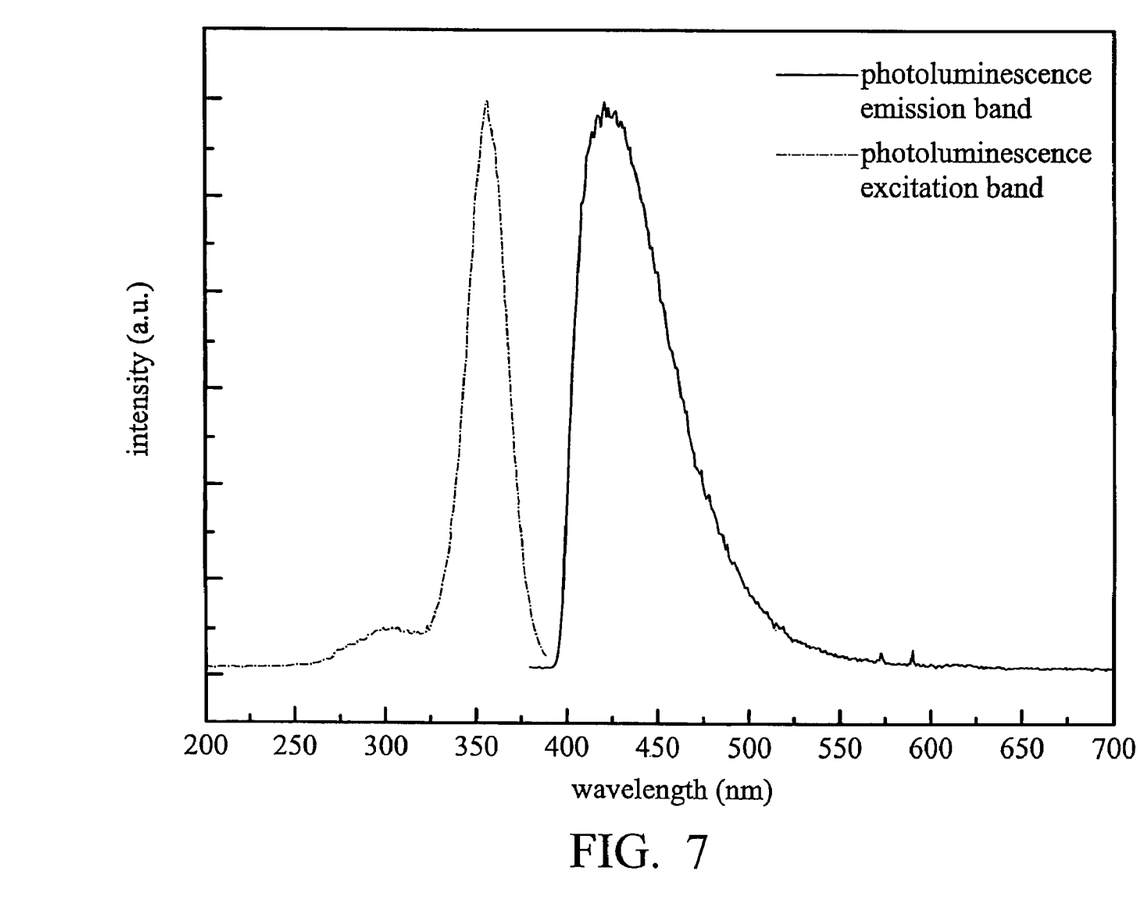
FIG. 7 is a photoluminescence spectrum of the borate phosphor $NaBa_{0.99}BO_3:Ce_{0.01}$ in one example of the invention.

0.5 mol of $Na_2CO_3$ (0.2650 g, FW=105.99, commercially available from TEDLA, 99.8%), 0.99 mol of $BaCO_3$ (0.9768 g, FW=197.338, commercially available from ALDRICH, 99.99%), 0.01 mol of $CeO_2$ (0.0086 g, FW=172.118, commercially available from STREM, 99.998%), and 1 mol of $H_3BO_3$ (0.3092 g, FW=61.83, commercially available from STREM, 99.9995%) were weighted, evenly mixed and grinded, and charged in a double-crucible. The double-crucible was then stuffed by graphite, and then heated in a high temperature furnace. After sintering at 700-1000° C. for 10 hours, washing, filtering, and heat drying, pure phase of the borate phosphor $NaBa_{0.99}BO_3:Ce_{0.01}$ was prepared. The photoluminescence spectrum of the described product is shown in FIG. 7. The major peak of the excitation band is 356 nm, the major peak of the emission band is 423 nm, and the CIE coordination is (0.16, 0.07).

Example 8

Figure 8:
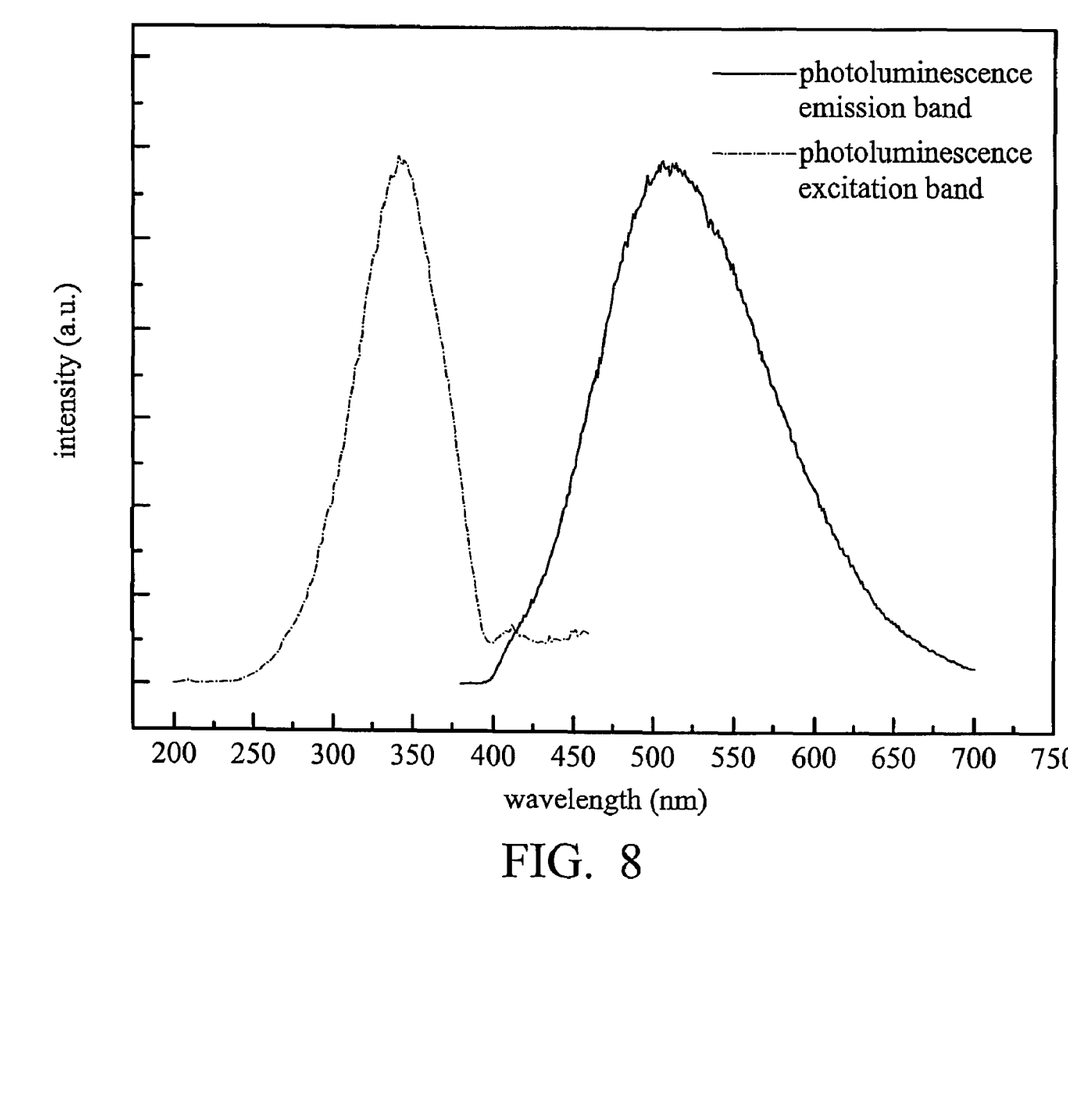
FIG. 8 is a photoluminescence spectrum of the borate phosphor $NaCa_{0.98}BO_3:Eu_{0.02}$ in one example of the invention.

0.5 mol of $Na_2CO_3$ (0.2650 g, FW=105.99, commercially available from TEDLA, 99.8%), 0.98 mol of $CaCO_3$ (0.4904 g, FW=100.086, commercially available from ALDRICH, 99.99%), 0.02 mol of $Eu_2O_3$ (0.0176 g, FW=351.92, commercially available from ALDRICH, 99.9%), and 1 mol of $H_3BO_3$ (0.3092 g, FW=61.83, commercially available from STREM, 99.9995%) were weighted, evenly mixed and grinded, and charged in a double-crucible. The double-crucible was then stuffed by graphite, and then heated in a high temperature furnace. After sintering at 700-1000° C. for 10 hours, washing, filtering, and heat drying, pure phase of the borate phosphor $NaCa_{0.98}BO_3:Eu_{0.02}$ was prepared. The photoluminescence spectrum of the described product is shown in FIG. 8. The major peak of the excitation band is 341 nm, the major peak of the emission band is 509 nm, and the CIE coordination is (0.27, 0.33).

Example 9

Figure 9:
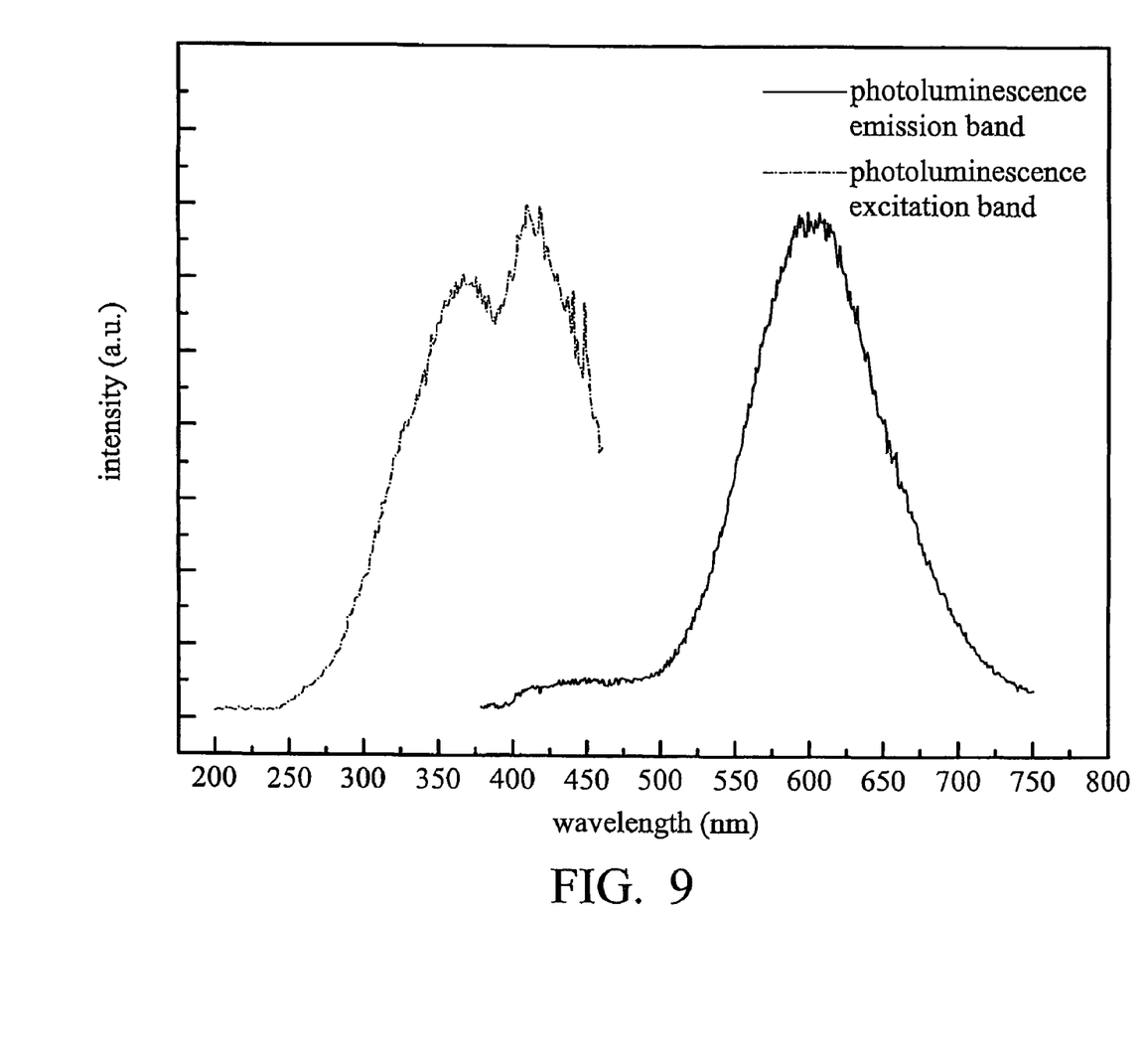
FIG. 9 is a photoluminescence spectrum of the borate phosphor $NaSr_{0.98}BO_3:Eu_{0.02}$ in one example of the invention.

0.5 mol of $Na_2CO_3$ (0.2650 g, FW=105.99, commercially available from TEDLA, 99.8%), 0.98 mol of $SrCO_3$ (0.7233 g, FW=147.63, commercially available from ALDRICH, 99.9%), 0.02 mol of $Eu_2O_3$ (0.0176 g, FW=351.92, commercially available from ALDRICH, 99.9%), and 1 mol of $H_3BO_3$ (0.3092 g, FW=61.83, commercially available from STREM, 99.9995%) were weighted, evenly mixed and grinded, and charged in a double-crucible. The double-crucible was then stuffed by graphite, and then heated in a high temperature furnace. After sintering at 700-1000° C. for 10 hours, washing, filtering, and heat drying, pure phase of the borate phosphor $NaSr_{0.98}BO_3:Eu_{0.02}$ was prepared. The photoluminescence spectrum of the described product is shown in FIG. 9. The major peak of the excitation band is 410 nm, the major peak of the emission band is 601 nm, and the CIE coordination is (0.51, 0.43).

Example 10

Figure 10:
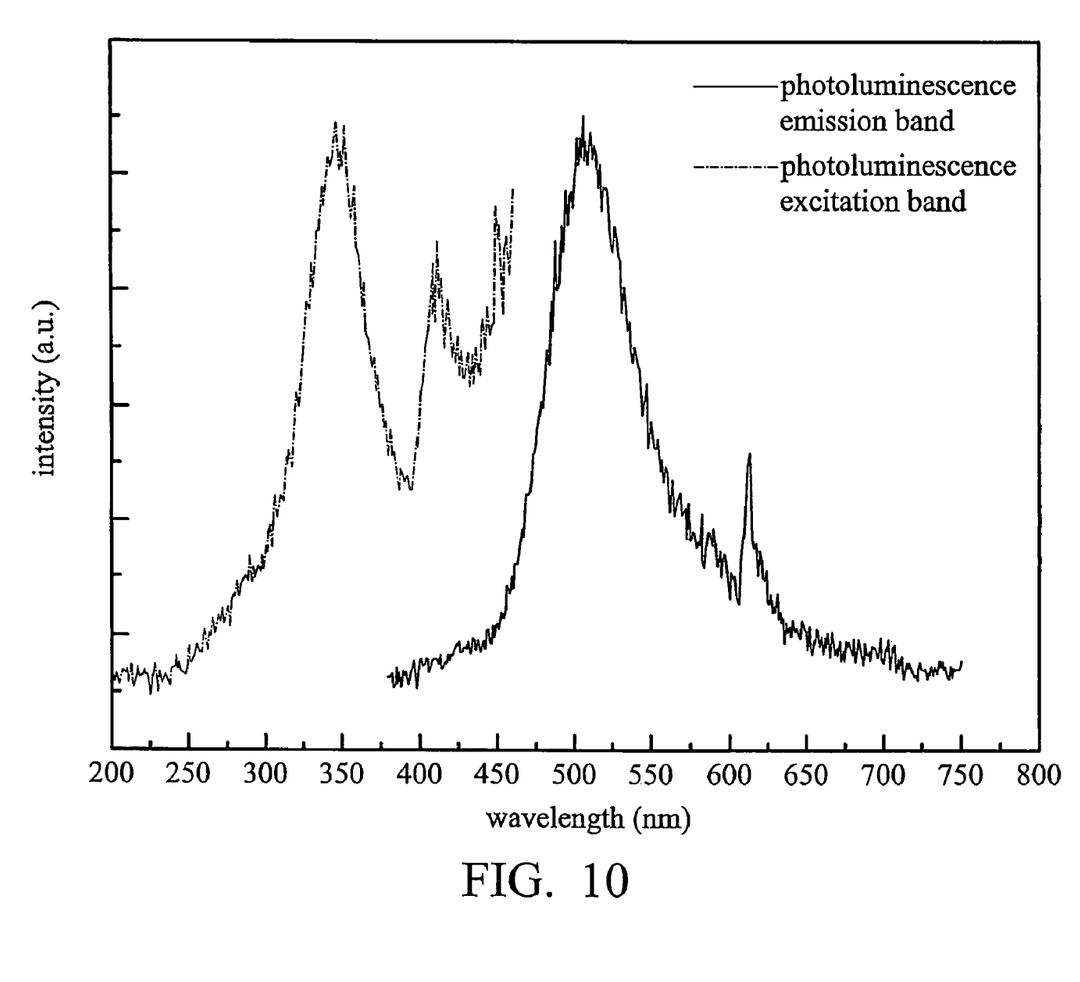
FIG. 10 is a photoluminescence spectrum of the borate phosphor $NaBa_{0.98}BO_3:Eu_{0.02}$ in one example of the invention.

0.5 mol of $Na_2CO_3$ (0.2650 g, FW=105.99, commercially available from TEDLA, 99.8%), 0.98 mol of $BaCO_3$ (0.9670 g, FW=197.338, commercially available from ALDRICH, 99.99%), 0.02 mol of $Eu_2O_3$ (0.0176 g, FW=351.92, commercially available from ALDRICH, 99.9%), and 1 mol of $H_3BO_3$ (0.3092 g, FW=61.83, commercially available from STREM, 99.9995%) were weighted, evenly mixed and grinded, and charged in a double-crucible. The double-crucible was then stuffed by graphite, and then heated in a high temperature furnace. After sintering at 700-1000° C. for 10 hours, washing, filtering, and heat drying, pure phase of the borate phosphor $NaBa_{0.98}BO_3:Eu_{0.02}$ was prepared. The photoluminescence spectrum of the described product is shown in FIG. 10. The major peak of the excitation band is 347 nm, the major peak of the emission band is 507 nm, and the CIE coordination is (0.28, 0.44).

Example 11

Figure 11:
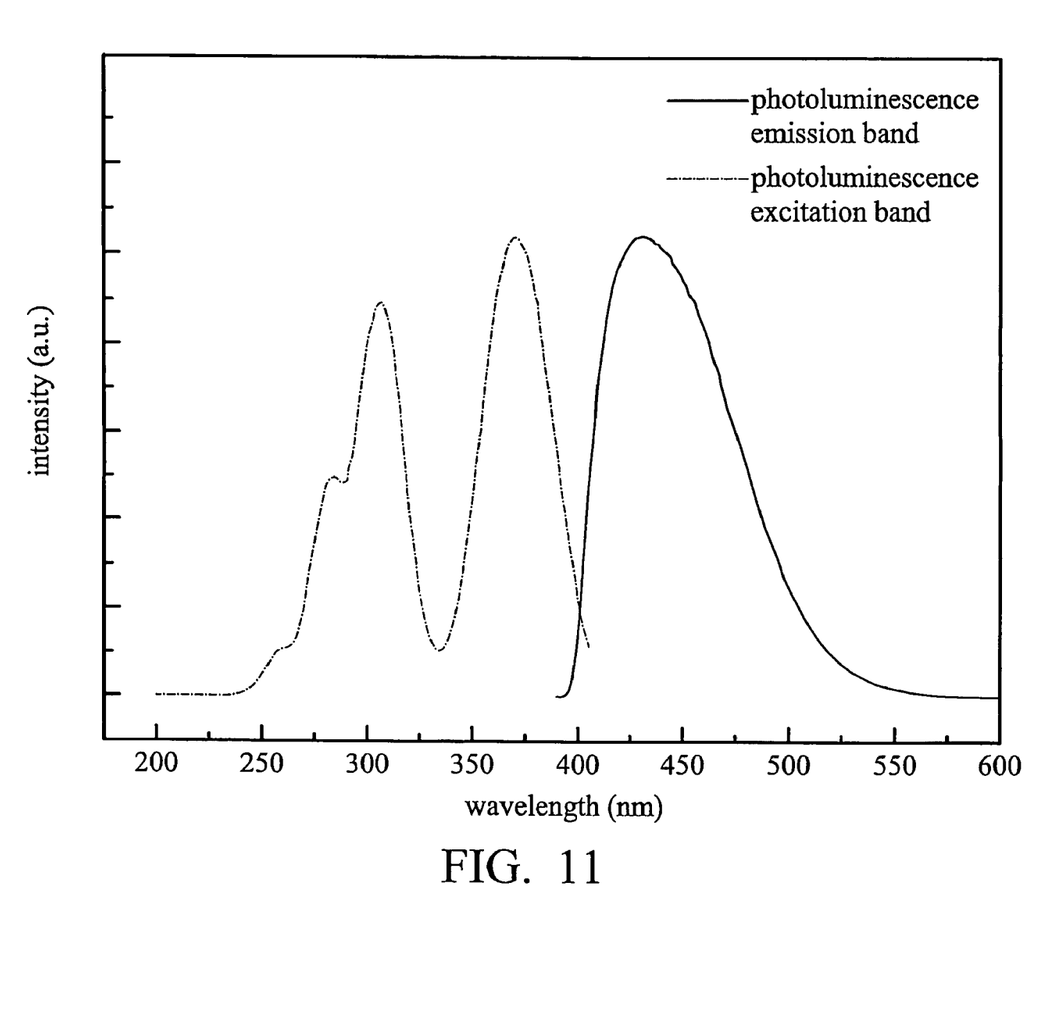
FIG. 11 is a photoluminescence spectrum of the borate phosphor $KCa_{0.99}BO_3:Ce_{0.01}$ in one example of the invention.

0.5 mol of $K_2CO_3$ (0.3455 g, FW=138.21, commercially available from SHOWA, 99.8%), 0.99 mol of $CaCO_3$ (0.4954 g, FW=100.086, commercially available from ALDRICH, 99.99%), 0.01 mol of $CeO_2$ (0.0086 g, FW=172.118, commercially available from STREM, 99.998%), and 1 mol of $H_3BO_3$ (0.3092 g, FW=61.83, commercially available from STREM, 99.9995%) were weighted, evenly mixed and grinded, and charged in a double-crucible. The double-crucible was then stuffed by graphite, and then heated in a high temperature furnace. After sintering at 700-1000° C. for 10 hours, washing, filtering, and heat drying, pure phase of the borate phosphor $KCa_{0.99}BO_3:Ce_{0.01}$ was prepared. The photoluminescence spectrum of the described product is shown in FIG. 11. The major peak of the excitation band is 370 nm, the major peak of the emission band is 429 nm, and the CIE coordination is (0.14, 0.06).

Example 12

Figure 12:
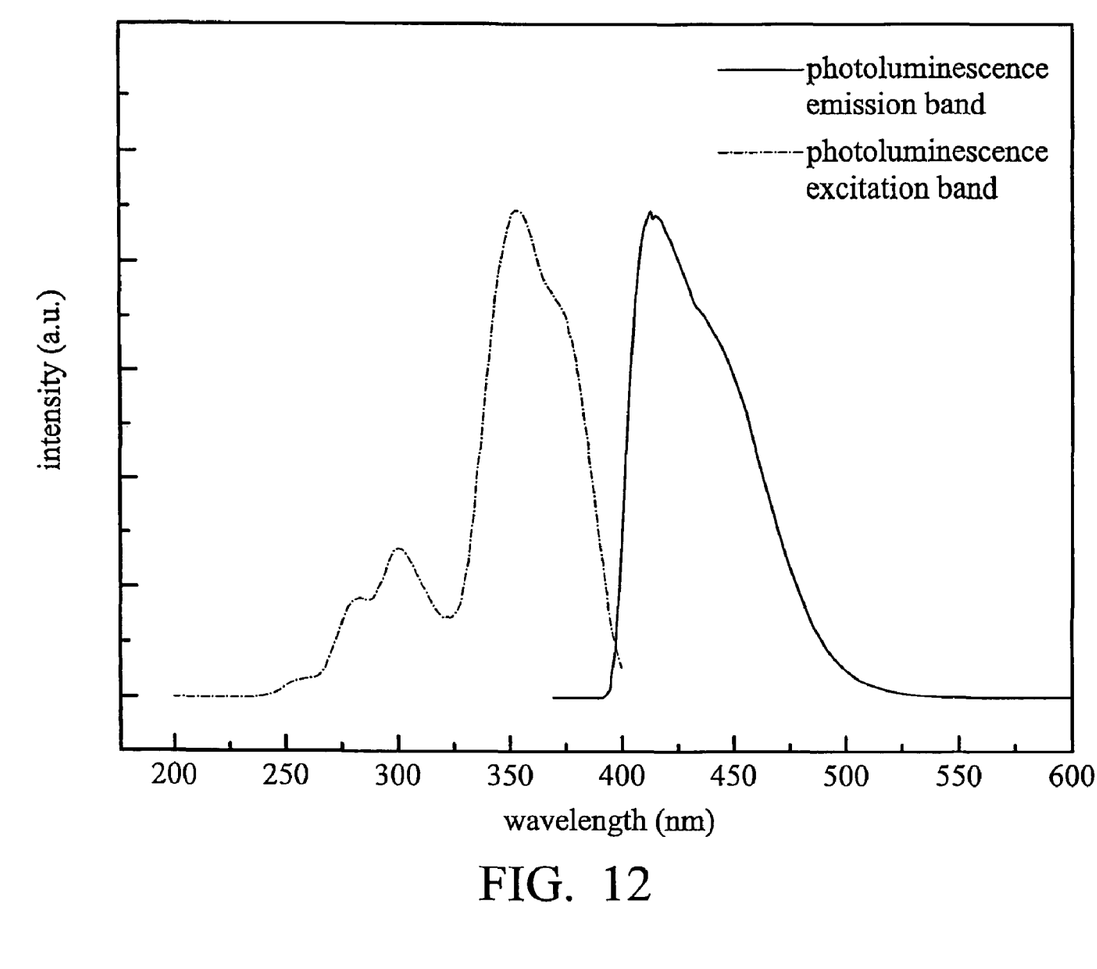
FIG. 12 is a photoluminescence spectrum of the borate phosphor $KSr_{0.99}BO_3:Ce_{0.01}$ in one example of the invention.

0.5 mol of $K_2CO_3$ (0.3455 g, FW=138.21, commercially available from SHOWA, 99.8%), 0.99 mol of $SrCO_3$ (0.7308 g, FW=147.63, commercially available from ALDRICH, 99.9%), 0.01 mol of $CeO_2$ (0.0086 g, FW=172.118, commercially available from STREM, 99.998%), and 1 mol of $H_3BO_3$ (0.3092 g, FW=61.83, commercially available from STREM, 99.9995%) were weighted, evenly mixed and grinded, and charged in a double-crucible. The double-crucible was then stuffed by graphite, and then heated in a high temperature furnace. After sintering at 700-1000° C. for 10 hours, washing, filtering, and heat drying, pure phase of the borate phosphor $KSr_{0.99}BO_3:Ce_{0.01}$ was prepared. The photoluminescence spectrum of the described product is shown in FIG. 12. The major peak of the excitation band is 353 nm, the major peak of the emission band is 415 nm, and the CIE coordination is (0.14, 0.03).

Figure 13:
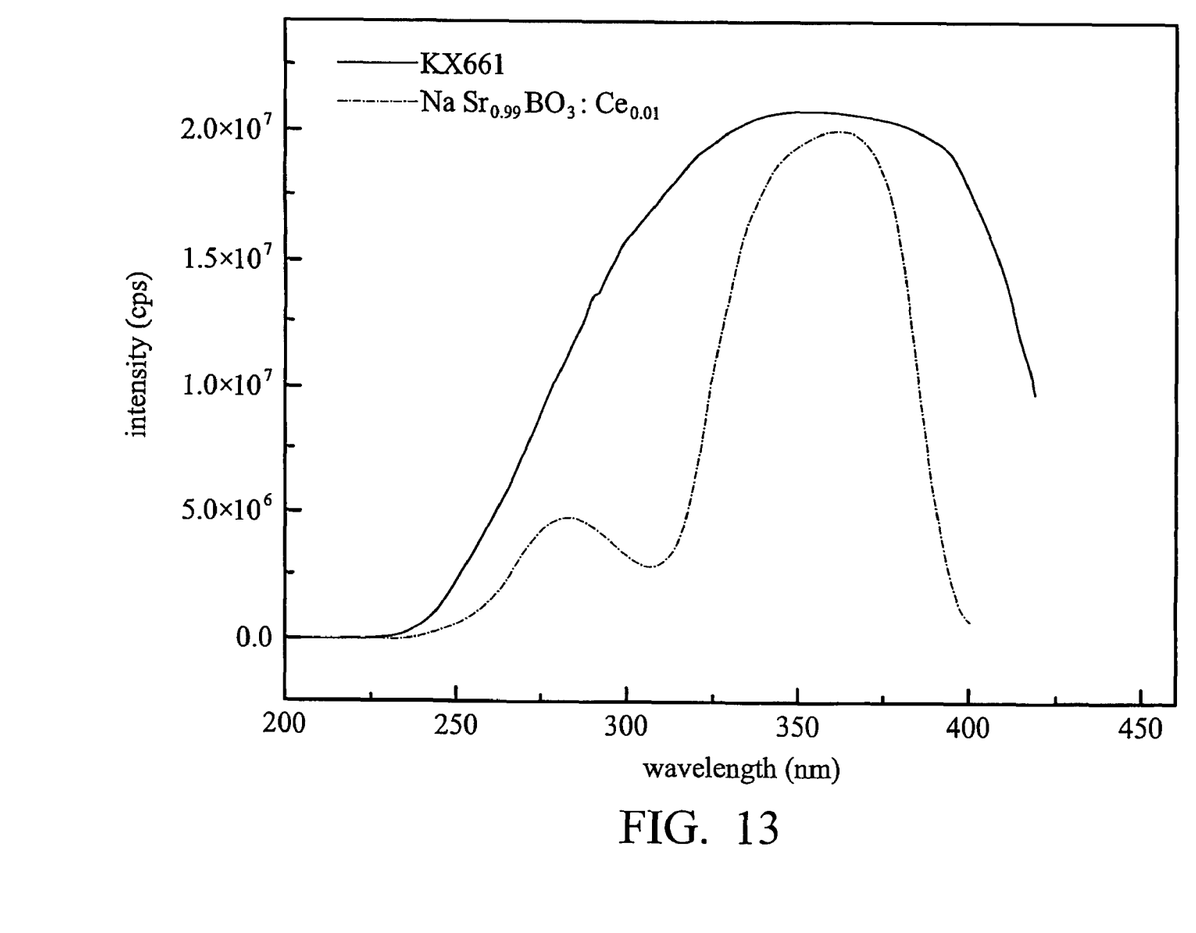
FIG. 13 is a comparison of the photoluminescence excitation spectrum between the borate phosphor $NaSr_{0.99}BO_3:Ce_{0.01}$ and Kasei KX661.
Figure 14:
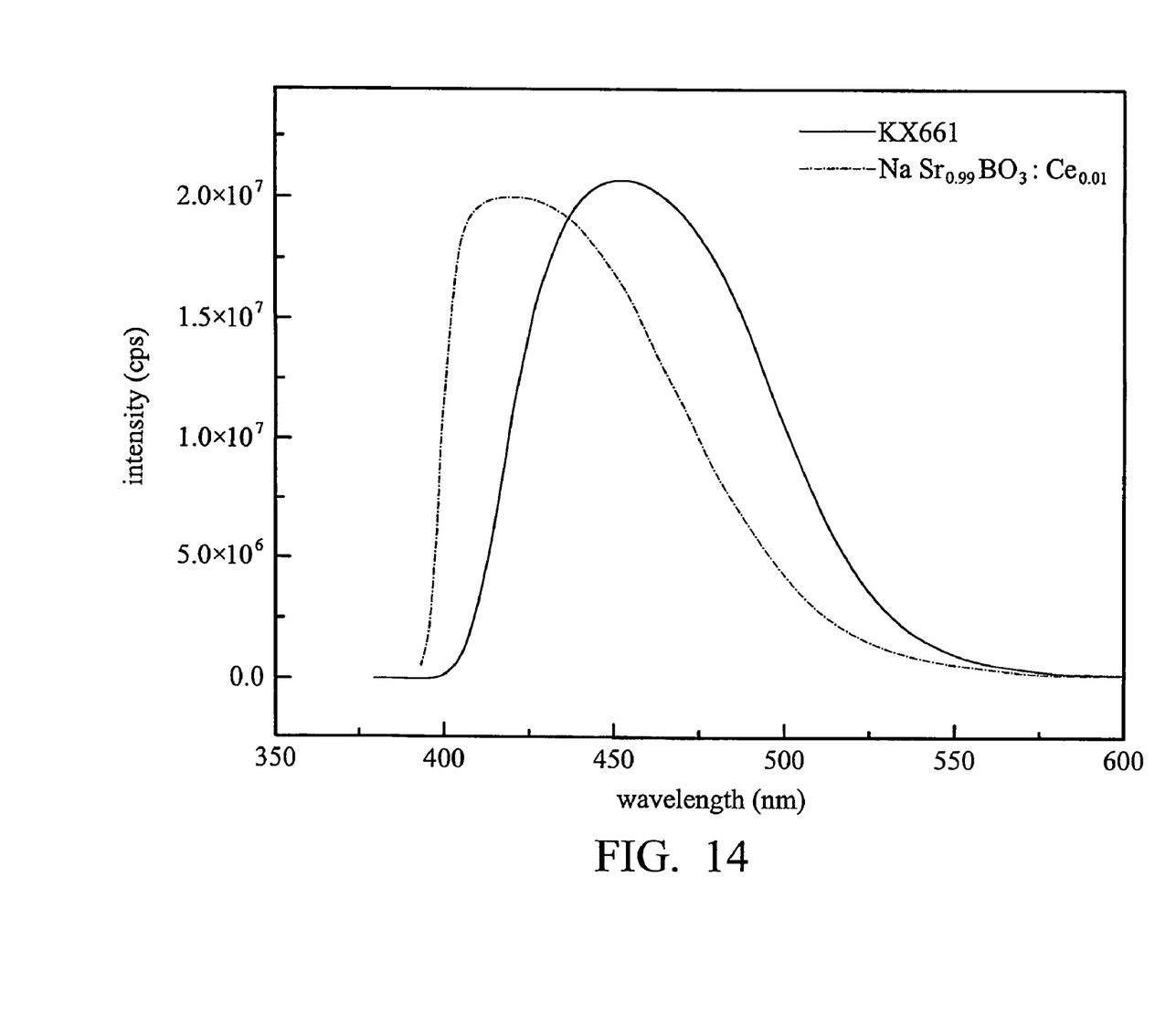
FIG. 14 is a comparison of the photoluminescence emission spectrum between the borate phosphor $NaSr_{0.99}BO_3:Ce_{0.01}$ and Kasei KX661.

The borate phosphors of the examples have excellent emission brightness and color saturation, thereby being suitable to be applied as phosphor of white light illumination devices. Comparing with the Kasei KX661 ($BaMgAl_{10}O_{17}:Eu^{2+}$, CIE coordination (0.15, 0.07), commercially available from Kasei), the borate phosphor $NaSr_{0.99}BO_3:Ce_{0.01}$ in Example 6 has similar emission brightness and better color saturation. The comparison of the photoluminescence spectrum between the borate and KX661 is shown in FIG. 13 and 14, respectively.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A borate phosphor, having a formula:
$LiCa_{1-x}BO_3:Ce_x$, $LiSr_{1-x}BO_3:Ce_x$, $LiBa_{1-x}BO_3:Ce_x$, $NaCa_{1-x}BO_3:Ce_x$, $NaSr_{1-x}BO_3:Ce_x$, $NaBa_{1-x}BO_3:Ce_x$, $NaCa_{1-x}BO_3:Eu_x$, $NaSr_{1-x}BO_3:Eu_x$, $NaBa_{1-x}BO_3:Eu_x$, $KCa_{1-x}BO_3:Ce_x$, or $KSr_{1-x}BO_3:Ce_x$, and $0 < x \leq 0.3$.

2. The borate phosphor as claimed in claim 1 being $LiCa_{0.99}BO_3:Ce_{0.01}$, wherein the borate phosphor is excited by 200-400 nm UV or 400-470 nm blue light to emit a violet light, and the violet light has a major emission peak of about 413 nm and a CIE coordination of (0.16, 0.03).

3. The borate phosphor as claimed in claim 1 being $LiSr_{0.99}BO_3:Ce_{0.01}$, wherein the borate phosphor is excited by 200-400 nm UV or 400-470 nm blue light to emit a violet light, and the violet light has a major emission peak of about 392 nm and a CIE coordination of (0.16, 0.03).

4. The borate phosphor as claimed in claim 1 being $LiBa_{0.99}BO_3:Ce_{0.01}$, wherein the borate phosphor is excited by 200-400 nm UV or 400-470 nm blue light to emit a violet light, and the violet light has a major emission peak of about 382 nm and a CIE coordination of (0.17, 0.05).

5. The borate phosphor as claimed in claim 1 being $NaCa_{0.99}BO_3:Ce_{0.01}$, wherein the borate phosphor is excited by 200-400 nm UV or 400-470 nm blue light to emit a blue-violet light, and the blue-violet light has a major emission peak of about 423 nm and a CIE coordination of (0.16, 0.11).

6. The borate phosphor as claimed in claim 1 being $NaSr_{0.99}BO_3:Ce_{0.01}$, wherein the borate phosphor is excited by 200-400 nm UV or 400-470 nm blue light to emit a blue-violet light, and the blue-violet light has a major emission peak of about 423 nm and a CIE coordination of (0.15, 0.04).

7. The borate phosphor as claimed in claim 1 being $NaBa_{0.99}BO_3:Ce_{0.01}$, wherein the borate phosphor is excited by 200-400 nm UV or 400-470 nm blue light to emit a blue-violet light, and the blue-violet light has a major emission peak of about 423nm and a CIE coordination of (0.16, 0.07).

8. The borate phosphor as claimed in claim 1 being $NaCa_{0.98}BO_3:Eu_{0.02}$, wherein the borate phosphor is excited by 200-400 nm UV or 400-470 nm blue light to emit a yellow light, and the yellow light has a major emission peak of about 509 nm and a CIE coordination of (0.27, 0.33).

9. The borate phosphor as claimed in claim 1 being $NaSr_{0.98}BO_3:Eu_{0.02}$, wherein the borate phosphor is excited by 200-400 nm UV or 400-470 nm blue light to emit a orange light, and the orange light has a major emission peak of about 601 nm and a CIE coordination of (0.51, 0.43).

10. The borate phosphor as claimed in claim 1 being $NaBa_{0.98}BO_3:Eu_{0.02}$, wherein the borate phosphor is excited by 200-400 nm UV or 400-470 nm blue light to emit a yellow light, and the yellow light has a major emission peak of about 507 nm and a CIE coordination of (0.28, 0.44).

11. The borate phosphor as claimed in claim 1 being $KCa_{0.99}BO_3:Ce_{0.01}$, wherein the borate phosphor is excited by 200-400 nm UV or 400-470 nm blue light to emit a blue-violet light, and the blue-violet light has a major emission peak of about 430 nm and a CIE coordination of (0.14, 0.06).

12. The borate phosphor as claimed in claim 1 being $KSr_{0.99}BO_3:Ce_{0.01}$, wherein the borate phosphor is excited by 200-400 nm UV or 400-470 nm blue light to emit a violet light, and the violet light has a major emission peak of about 495 nm and a CIE coordination of (0.14, 0.03).

13. A white light illumination device, comprising the borate phosphor as claimed in claim 1 and an excitation light source, wherein the excitation light source emits 200-400 nm UV or 400-470 nm blue light.

14. The white light illumination device as claimed in claim 13, wherein the excitation light source comprises a light emitting diode or a laser diode.

15. The white light illumination device as claimed in claim 13, further comprising a yellow phosphor.

16. The white light illumination device as claimed in claim 15, wherein the yellow phosphor comprises $Y_3Al_5O_{12}:Ce^{3+}$, $Tb_3Al_5O_{12}:Ce^{3+}$, or $(Mg, Ca, Sr, Ba)_2SiO_4:Eu^{2+}$.

17. The white light illumination device as claimed in claim 13, further comprising a red phosphor and a green phosphor.

18. The white light illumination device as claimed in claim 17, wherein the red phosphor comprises $(Sr,Ca)S:Eu^{2+}$, $(Y,La,Gd,Lu)_2O_3:Eu^{3+},Bi^{3+}$, $(Y,La,Gd,Lu)_2O_2S:Eu^{3+},Bi^{3+}$, $Ca_2Si_5N_8:Eu^{2+}$, or ZnCdS:AgCl.

19. The white light illumination device as claimed in claim 17, wherein the green phosphor comprises $BaMgAl_{10}O_{17}:Eu^{2-},Mn^{2+}$, $SrGa_2S_4:Eu^{2+}$, $(Ca,Sr,Ba)Al_2O_4:Eu^{2+},Mn^{2+}$, $(Ca,Sr,Ba)_4Al_{14}O_{25}:Eu^{2+}$, or $Ca_8Mg(SiO_4)_4Cl_2:Eu^{2+},Mn^{2+}$.

* * * * *